(12) United States Patent
Ramadorai et al.

(10) Patent No.: US 12,358,650 B2
(45) Date of Patent: Jul. 15, 2025

(54) ORBIT AWARE NETWORK ROUTING

(71) Applicant: Blue Origin Manufacturing, LLC, Huntsville, AL (US)

(72) Inventors: Arun Ray Ramadorai, Sammamish, WA (US); Peter S. Fidelman, Bainbridge, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 331 days.

(21) Appl. No.: 18/058,626

(22) Filed: Nov. 23, 2022

(65) Prior Publication Data

US 2024/0166376 A1 May 23, 2024

(51) Int. Cl.
  *B64G 1/24* (2006.01)
  *B64G 1/10* (2006.01)

(52) U.S. Cl.
  CPC ........... *B64G 1/242* (2013.01); *B64G 1/1007* (2013.01)

(58) Field of Classification Search
  CPC .............................. B64G 1/242; B64G 1/1007
  USPC ....................................................... 455/12.1
  See application file for complete search history.

(56) References Cited

U.S. PATENT DOCUMENTS

| | | |
|---|---|---|
| 7,764,622 B2 | 7/2010 | El Damhougy et al. |
| 7,881,217 B2 | 2/2011 | El Damhougy et al. |
| 10,142,013 B2 | 11/2018 | El Damhougy et al. |
| 10,476,584 B1 | 11/2019 | Minelli et al. |
| 11,032,751 B2 | 6/2021 | Arur et al. |

(Continued)

FOREIGN PATENT DOCUMENTS

| | | |
|---|---|---|
| CN | 104821844 A | 8/2015 |
| CN | 108011661 A | 5/2018 |

(Continued)

OTHER PUBLICATIONS

Alaoui, Sara El, Sara El Alaoui, and Byrav Ramamurthy. "Routing Optimization for DTN-Based Space Networks Using a Temporal Graph Model." *IEEE International Conference on Communications (ICC)*. https://doi.org/10.1109/icc.2016.7510733, 2016.

(Continued)

*Primary Examiner* — Don N Vo
(74) *Attorney, Agent, or Firm* — Knobbe, Martens, Olson & Bear, LLP

(57) ABSTRACT

A method of routing communication among nodes and systems of an interplanetary network on an ad-hoc basis is described herein. For example, the communication routing described herein may not be pre-determined or static, but rather determined dynamically on a periodic basis, as transmission conditions change, as nodes are added or removed from the interplanetary network, periodically, and/or the like. The interplanetary network may include one or more nodes that have static and/or dynamic states. A node can include any extraterrestrial object or communication relay. The interplanetary network may also include one or more ground stations, which can include communication equipment (e.g., antennas, radar, transmission towers, etc.) located on Earth. To enable the ad-hoc communication routing, a ground station system and/or another processing device can continuously or periodically obtain orbital parameters from one or more nodes in the interplanetary network and generate updated contact plans.

23 Claims, 5 Drawing Sheets

(56) References Cited

U.S. PATENT DOCUMENTS

| | | | | |
|---|---|---|---|---|
| 2008/0151913 | A1* | 6/2008 | El-Damhougy | ... H04B 7/18584 370/331 |
| 2017/0005719 | A1* | 1/2017 | Krebs | ............... H04B 7/19 |
| 2019/0007127 | A1 | 1/2019 | Ward | |
| 2021/0084565 | A1* | 3/2021 | Ananth | ............... H04W 40/22 |
| 2022/0302999 | A1* | 9/2022 | Velazco | ............ H04B 7/18528 |
| 2024/0195496 | A1* | 6/2024 | Rezaee | ............. H04B 7/18521 |

FOREIGN PATENT DOCUMENTS

| | | |
|---|---|---|
| CN | 113037363 A | 6/2021 |
| CN | 113056877 A | 6/2021 |

OTHER PUBLICATIONS

Alemzadeh, S., and M. Mesbahi. "Distributed Q-Learning for Dynamically Decoupled Systems." In *Proceedings of the American Control Conference*, 772-77, 2019.

Analog Devices. AD9600. https://www.analog.com/en/products/ad9600.html# Accessed on Mar. 15, 2023.

Araniti, Giuseppe, Nikolaos Bezirgiannidis, Edward Birrane, Igor Bisio, Scott Burleigh, Carlo Caini, Marius Feldmann, Mario Marchese, John Segui, and Kiyohisa Suzuki. "Contact Graph Routing in DTN Space Networks: Overview, Enhancements and Performance." *IEEE Communications Magazine* 53 (3): 38-46, 2015.

Awad, Armand, Airlie Chapman, Eric Schoof, Anshu Narang-Siddarth, and Mehran Mesbahi. "Time-Scale Separation in Networks: State-Dependent Graphs and Consensus Tracking." *IEEE Transactions on Control of Network Systems* 6 (1): 104-14, 2019.

Bertsekas, Dimitri. "Multiagent Value Iteration Algorithms in Dynamic Programming and Reinforcement Learning." *Results in Control and Optimization*. https://doi.org/10.1016/j.rico.2020.100003, 2020.

Bertsekas, Dimitri. "Multiagent Reinforcement Learning: Rollout and Policy Iteration." *IEEE/CAA Journal of Automatica Sinica* 8 (2): 249-72, 2021.

Birrane, Ed, and Jason Soloff. *Designing Delay-Tolerant Applications for Store-and-Forward Networks*. Artech House, 2020.

Busoniu, Lucian, Robert Babuska, Bart De Schutter, and Damien Ernst. *Reinforcement Learning and Dynamic Programming Using Function Approximators*. CRC Press, 2020.

Caini, Carlo, and Rosario Firrincieli. "Application of Contact Graph Routing to LEO Satellite DTN Communications." *IEEE International Conference on Communications*. https://doi.org/10.1109/icc.2012.6363686, 2012.

Chapman, Airlie, and Mehran Mesbahi. 2016. "Multiple Time-Scales in Network-of-Networks." In *Proceedings of the American Control Conference*, pp. 5563-5568, 2016.

Chelmins, David, Janette Briones, Joseph Downey, Gilbert Clark, and Adam Gannon. n.d. "Cognitive Communications for NASA Space Systems," https://ntrs.nasa.gov/api/citations/20190032643/downloads/20190032643.pdf., 2019.

Dai, Cuiqin, Qingyang Song, Lei Guo, and Qianbin Chen. "Contact Graph Routing with Network Coding for LEO Satellite DTN Communications." *Communications in Computer and Information Science*. https://doi.org/10.1007/978-981-10-4403-8_12, 2017.

Dai, Ran, Joshua Maximoff, and Mehran Mesbahi. "Establishing Connectivity in Proximity Networks." In *Proceeding of the American Control Conference*, 4180-4185, 2012.

Dai, Ran, Joshua Maximoff, and Mehran Mesbahi. "Optimal Trajectory Generation for Establishing Connectivity in Proximity Networks." *IEEE Transactions on Aerospace and Electronic Systems* 49 (3): 1968-81, 2013.

Delay/Disruption Tolerant Networking. Reliable Solar System Internet Connection. Sep. 29, 2020. NASA. Captured Jul. 2, 2021. https://www.nasa.gov/directorates/heo/scan/engineering/technology/disruption_tolerant_networking.

Gramling, Jeffrey, Yi-Pheng Ngan, David Quinn, David Folta, Bruce LeRoy, and Anne Long. "A Lunar Communications and Navigation Satellite Concept for Robotic Lunar Exploration Program." *24th AIAA International Communications Satellite Systems Conference*, 2006.

Hudoba de Badyn, Mathias, and Mehran Mesbahi. "Large-Scale Distributed Kalman Filtering via an Optimization Approach." *IFAC-PapersOnLine*, 50 (1): 10742-47, 2017.

Israel, David J., Kendall D. Mauldin, Christopher J. Roberts, Jason W. Mitchell, Antti A. Pulkkinen, La Vida D. Cooper, Michael A. Johnson, Steven D. Christe, and Cheryl J. Gramling. "LunaNet: A Flexible and Extensible Lunar Exploration Communications and Navigation Infrastructure." *IEEE Aerospace Conference*, 1-14, 2020.

Kim, Y., and M. Mesbahi. "On Maximizing the Second Smallest Eigenvalue of a State-Dependent Graph Laplacian." *IEEE Transactions on Automatic Control* 51 (1): 116-120, 2006.

Maral, Gerard, Michel Bousquet, and Zhili Sun. *Satellite Communications Systems: Systems, Techniques and Technology*. John Wiley & Sons, Table of Contents, 2020.

Mwanje, Stephen S., and Christian Mannweiler. *Towards Cognitive Autonomous Networks: Network Management Automation for 5G and Beyond*. John Wiley & Sons, Table of Contents, 2020.

Mesbahi, Mehran, and Magnus Egerstedt. *Graph Theoretic Methods in Multiagent Networks*. Princeton University Press, Table of Contents, 2010.

Mesbahi, Mehran, "On a Dynamic Extension of the Theory of Graphs." In *Proceedings of the American Control Conference*, 1234-1239, 2002.

Mesbahi, Mehran, "On State-Dependent Dynamic Graphs and Their Controllability Properties." *IEEE Transactions on Automatic Control*, 50 (3): 387-392, 2005.

Szepesvári, Csaba. *Algorithms for Reinforcement Learning*. Morgan & Claypool Publishers, Table of Contents, 2010.

Talebi, Shahriar, Siavash. Alemzadeh, Lillian. J. Ratliff, and Mehran Mesbahi. "Distributed Learning in Network Games: A Dual Averaging Approach." *In Proceedings of the IEEE Conference on Decision and Control*, 5544-49, 2019.

Tsitsiklis, John N., and Dimitri P. Bertsekas. 1984. "Distributed Asynchronous Optimal Routing in Data Networks." https://doi.org/10.21236/ada458791, 1984.

Yan et al. "Contact Plan Design for Navigation Satellite Network Based on Simulated Annealing." Institute of Spacecraft System Engineering China Academy of Space Technology, Beijing, China. IEEE 2015. pp. 12-16.

* cited by examiner

ORBIT AWARE NETWORK ROUTING

BACKGROUND

A terrestrial network may route communications between various devices located on the surface of Earth. Typically, a network routing algorithm that defines how the terrestrial network routes the communications relies on having a fixed performance for each communication link. Often, the network routing algorithm has little to no information regarding the potential unavailability of a communication link and/or limited options for taking such information into account when making routing decisions.

An extraterrestrial network may route communications between extraterrestrial objects (e.g., nodes, such as satellites, autonomous spacecraft, crewed spacecraft, landers, rovers, extraterrestrial data collection devices, equipment located on a moon or planet other than Earth, etc.) and/or between extraterrestrial objects and ground equipment located on Earth. While relying on a fixed performance for each communication link and lacking information regarding the potential unavailability of a communication link may be sufficient for the purposes of terrestrial communication routing, such reliance and lack of information may negatively affect communication performance and routing in an extraterrestrial network.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
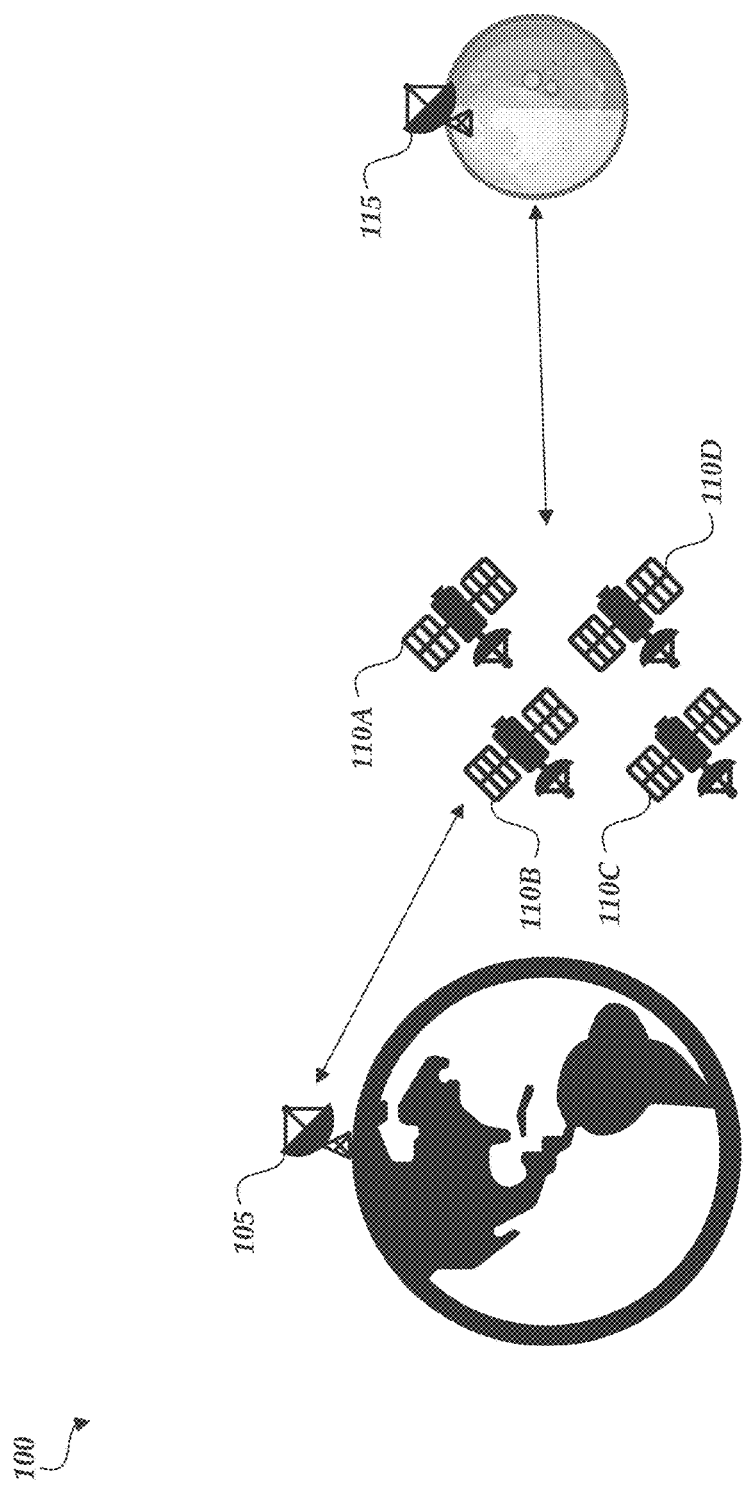
FIG. 1 depicts a schematic diagram illustrative of an interplanetary network in which various embodiments according to the present disclosure can be implemented.

Typically, ground equipment located on Earth communicate with extraterrestrial objects via point-to-point links, and extraterrestrial objects may communicate with each other via point-to-point links. For example, communications between ground equipment and extraterrestrial objects or between different extraterrestrial objects may occur when each party to the communication has a direct line of sight with the other party to the communication. However, a direct line of sight between ground equipment and an extraterrestrial object or between two extraterrestrial objects is not always present.

Techniques exist to enable communications between ground equipment and extraterrestrial objects and/or between two extraterrestrial objects using a series of hops between nodes (e.g., satellites), which can provide connectivity if there is no direct line of sight between the party originating the communication and the party that is the intended recipient of the communication. However, in some cases there may not even be a direct line of sight between a party originating a communication and a hop or between two hops in the series for a temporary period of time. A disruption-tolerant network (DTN) may be a network in which it is assumed that communication links may sometimes be unavailable. For example, an orbiting satellite may communicate with a ground station when the orbiting satellite has a line of sight either to the ground station or to a communication relay (which may be a satellite) that is in contact directly or indirectly with the ground station. Whether the satellite has a line of sight to the ground station or a communication relay that is in direct or indirect contact with the ground station may depend on the orbit of the satellite, the orbit of the communication relay, and/or whether a communication path is experiencing unplanned outages. In a situation in which no communication path is available, the DTN may dictate that the sending party (e.g., the ground station or the satellite) store the messages to be sent and later transmit the messages when the communication path becomes available.

Typical DTNs coordinate communications between ground equipment, extraterrestrial objects, and/or communication relays using a pre-determined contact plan. A contact plan may be a time-indexed list of communication opportunities. For example, the contact plan may include, for some or all of the entities in the network (e.g., ground station equipment, an extraterrestrial object, a communication relay, etc.), an identification of a start time and an end time at which the respective entity is available to communicate with one or more other entities in the network, an identification of a transceiver that may be available for use in transmitting or receiving communications during communication availability times, one or more (optimal) communication paths between a first entity and a second entity during various time periods given the availability of entities in the network to communicate with each other, and/or the like. Generally, the contact plan is generated during the mission planning phase (e.g., before any communication relays, extraterrestrial objects, etc. have been deployed into space), meaning that the contact plan is static and does not factor in spacecraft dynamics or orbit and/or link performance in determining the routing of communications and/or the times at which communications can be routed between two objects in the network.

Because the contact plans are pre-determined and static, communication disruptions can occur if there are any changes the network. For example, communication disruptions may occur if the orbit of an extraterrestrial object and/or a communication relay changes, if new ground equipment, a new extraterrestrial object, and/or a new communication relay is added to the network, if existing ground equipment, an existing extraterrestrial object, and/or an existing communication relay is removed from the network, and/or the like. This lack of flexibility with typical DTNs can be problematic as space-based missions (e.g., planetary exploration missions) and/or spacefaring communication infrastructure become more complex.

Generally described, aspects of the present disclosure relate to a method of routing communication among nodes and systems of an interplanetary network on an ad-hoc basis. In other words, the communication routing described herein may not be pre-determined or static, but rather determined dynamically on a periodic basis, as transmission conditions change, as nodes are added or removed from the interplanetary network, periodically, and/or the like. For example, the interplanetary network may include one or more nodes that have static and/or dynamic states. A node can include any extraterrestrial object or communication relay. In the example of a spacecraft node or any other node in orbit, the spacecraft or other orbiting node may have dynamic states that are dependent on the position, velocity, and/or orientation of the spacecraft or other orbiting node, optionally expressed with respect to an inertially fixed coordinate frame centered at Earth, the Moon, and/or any other planet, star, moon, asteroid, comet, star, or other celestial body. The interplanetary network may also include one or more ground stations, which can include communication equipment (e.g., antennas, radar, transmission towers, etc.) located on Earth. The ground stations may also be associated with one or more states.

To enable the ad-hoc communication routing, a ground station system and/or another processing device can continuously or periodically obtain orbital parameters from one or more nodes in the interplanetary network. For example, the orbital parameters can include the position, velocity, orientation, orbital trajectory (which can be based on the position, velocity, and/or orientation of a node), and/or radio frequency (RF) capabilities (e.g., the number and/or type of transceiver that may be available to transmit and/or receive data, the transmitted or transmission power that may be available to transmit data, the received power (e.g., link budget) that may be available for receiving data, noise measurements, interference measurements, etc.) of a node at some time in the future, and can include different positions, velocities, orientations, orbital trajectories, and/or RF capabilities of the node at multiple times in the future. Nodes in the interplanetary network may be configured to continuously or periodically propagate their respective orbital parameters to one or more other nodes in the interplanetary network (e.g., relying on a current contact plan) for eventual transmission to the ground station system and/or other processing device and/or directly to the ground station system and/or other processing device.

The ground station system and/or other processing device can process the obtained orbital parameters to determine pairs of nodes in the interplanetary network that may have an available communication path (e.g., which pairs of nodes have a direct line of sight) during a given period of time. The ground station system and/or other processing device can also process the obtained orbital parameters to determine which pairs of nodes in the interplanetary network that may have an available communication path during a given period of time also have RF capabilities that would allow both nodes in the pair to communicate with each other. The ground station system and/or other processing device can make this determination for one or more pairs of nodes in the interplanetary network for one or more future time periods. Once determined, the ground station system and/or other processing device can identify, for a given time period and a node, a communication path between the respective node and the ground station system that is optimal for the transfer of data (e.g., that has the fewest number of hops, that results in the shortest transmission time from the node to the ground station system or vice-versa, that best reduces a backlog of messages to be transmitted (e.g., a longer path that has a higher network bandwidth than a shorter path may be more optimal because the longer path allows a set of data to be transferred faster collectively, resulting in a backlog of data transmissions to be reduced faster), etc.). The ground station system and/or other processing device can then incorporate this identification into an updated contact plan for the nodes in the interplanetary network, and transmit the updated contact plan to the nodes in the interplanetary network.

Alternatively or in addition, a node may obtain orbital parameters from other nodes and can generate an updated contact plan based on updated orbital parameters of the node or updated orbital parameters of another node in a manner as described herein. If the node generates an updated contact plan based on updates to its own orbital parameters, the node may transmit a message to other nodes and/or the ground station providing the updated contact plan or data that allows the other nodes and/or the ground station to generate an updated contact plan. If the node generates an updated contact plan based on updates to the orbital parameters of another node, the node can propagate the updated contact plan to other nodes and/or the ground station. Alternatively, if the node generates an updated contact plan based on updates to the orbital parameters of another node, the node may refrain from propagating the updated contact plan to other nodes and/or the ground station (e.g., because the other nodes and/or the ground station may independently generate an updated contact plan using the orbital parameters of the other node that matches the updated contact plan generated by the node).

By having nodes in the interplanetary network share their orbital parameters, it may not be necessary to develop and deploy a contact plan during a mission planning phase (e.g., in advance of the nodes in the interplanetary network being launched into space). Rather, the ground station system, communication relays, and/or other processing device can develop the contact plan automatically and on-the-fly (e.g., after one or more nodes in the interplanetary network have already been deployed into space, once or after communication between nodes and the ground station system have commenced, after a new node is added to the interplanetary network, after an existing node is removed from the interplanetary network, during a space-based mission and/or after launch, etc.). In fact, by being able to develop the contact plan automatically and on-the-fly, the ground station system, communication relays, and/or other processing device can determine new or updated communication paths and update the contact plan accordingly to resolve post-launch issues, such as a communications backlog at a node, poor network-level bandwidth between one or more nodes and/or between a node and the ground station system, and/or the like.

FIG. 1 depicts a schematic diagram illustrative of an interplanetary network 100 (e.g., a modified version of a disruption or delay tolerant network (DTN)) in which various embodiments according to the present disclosure can be implemented. As shown in FIG. 1, the interplanetary network 100 can be a periodically or continuously evolving communication network that includes one or more ground stations 105 (e.g., any combination of communication equipment located on Earth, such as an antenna, radar, a transmission tower, etc.; a data processing system for processing received data (e.g., orbital parameters, RF capabilities, etc.) and/or for generating a new or updated contact plan; a data store for storing received data (e.g., orbital parameter, RF capabilities, etc.), a contact plan, etc.; etc.), one or more communication relays 110A-D (e.g., a satellite or any other equipment with reception and/or transmission capabilities), and/or one or more extraterrestrial objects 115 (e.g., communication equipment located on a moon or planet other than Earth, such as an antenna, radar, a transmission tower; landers; rovers; devices with sensors that can be used to measure, capture, and/or collect data or samples; etc.). As described herein, the communication relays 110A-D and/or the extraterrestrial objects 115 may collectively be referred to as nodes.

While a set number of components or entities are depicted in FIG. 1 as forming the interplanetary network 100, this is not meant to be limiting. For example, any number of components or entities (e.g., any number of ground stations 105, communication relays 110, and/or extraterrestrial objects 115) may form the interplanetary network 100. In fact, the interplanetary network 100 may be a periodically or continuously evolving network given that components or entities may be added or removed from the interplanetary network 100 as time passes.

The ground station 105 can be a fixed terrestrial node that is an endpoint for the interplanetary network 100. The ground station 105 may also function as a handoff or interface between the interplanetary network 100 and the Internet or another public or private network where typical Internet protocol (IP) routing protocols are used to ensure the delivery of data packets.

The communication relay(s) 110A-D may each transfer data between the extraterrestrial object(s) 115, other communication relay(s) 110A-D, and the ground station(s) 105. Alternatively or in addition, one or more of the communication relays 110A-D may measure or generate data and forward the data to the extraterrestrial object(s) 115, other communication relay(s) 110A-D, and/or the ground station(s) 105. The data transferred, measured, and/or generated may include any combination of orbital parameters, RF capabilities, telemetry data, scientific payload data (e.g., data measured, captured, and/or collected by a sensor), voice data, video data, audio data, a contact plan, data for updating a contact plan, and/or the like. The communication relay(s) 110A-D can support high speed RF trunk links (e.g., network bandwidth greater than 100 Mbps), optical links (e.g., network bandwidth of 1.0 Gbps), video streaming (e.g., network bandwidth greater than 100 Mbps), and/or other data transmission or connection types that involve high data transfer speeds and/or increased network bandwidth. The communication relay(s) 110A-D may be in-orbit (e.g., orbiting a celestial body, such as Earth, the Moon, another moon or planet, an asteroid, a comet, a star, etc.; orbiting a solar system, a galaxy, etc.; orbiting a manmade object (e.g., a space station); and/or orbiting any other entity present in space).

The extraterrestrial object 115 can be a stationary or mobile platform that is located on the surface of a celestial body, in a cislunar orbit (e.g., an orbit between Earth and the Moon or the Moon's orbit, including low Earth orbit (LEO), medium Earth orbit (MEO), geosynchronous orbit (GSO), lunar transit orbit, lunar orbits, Lagrange orbits, etc.), or in an orbit around any celestial body. The extraterrestrial object 115 may represent an endpoint in the interplanetary network 100 where data is generated, measured, and/or collected.

The interplanetary network 100 may be implemented such that the use of on-orbit communication relay(s) 110A-D for data transfer between ground station(s) 105 and extraterrestrial object(s) 115 is maximized. The interplanetary network 100 may be implemented in and applicable to any in-space network where orbital dynamics drive the performance and availability of a communications link. For example, components of the interplanetary network 100 may be configured to use one or more optimization routines (discussed in greater detail below) that optimize or improve communications to conserve bandwidth when compared with typical DTNs, and that cause a more reliable transfer of multiple types of data at a desired quality of service (QoS) when compared with typical DTNs, even when the participants of the data transfer are highly mobile and/or intermittently connected.

The ground station 105, the communication relays 110A-D, and/or the extraterrestrial object 115 may include a processing unit (e.g., one or more physical hardware processors), memory (e.g., for storing data and/or instructions to be executed by the processing unit), a network interface (e.g., for transmitting or receiving data), and/or other hardware components that enable the functionality described herein.

The interplanetary network 100 can be implemented for use in a variety of missions. For example, the interplanetary network 100 can be implemented for use in Lunar missions, planetary or other celestial object exploration missions, and/or any other space-based mission in which point-to-point links may not always be present.

Figure 2:
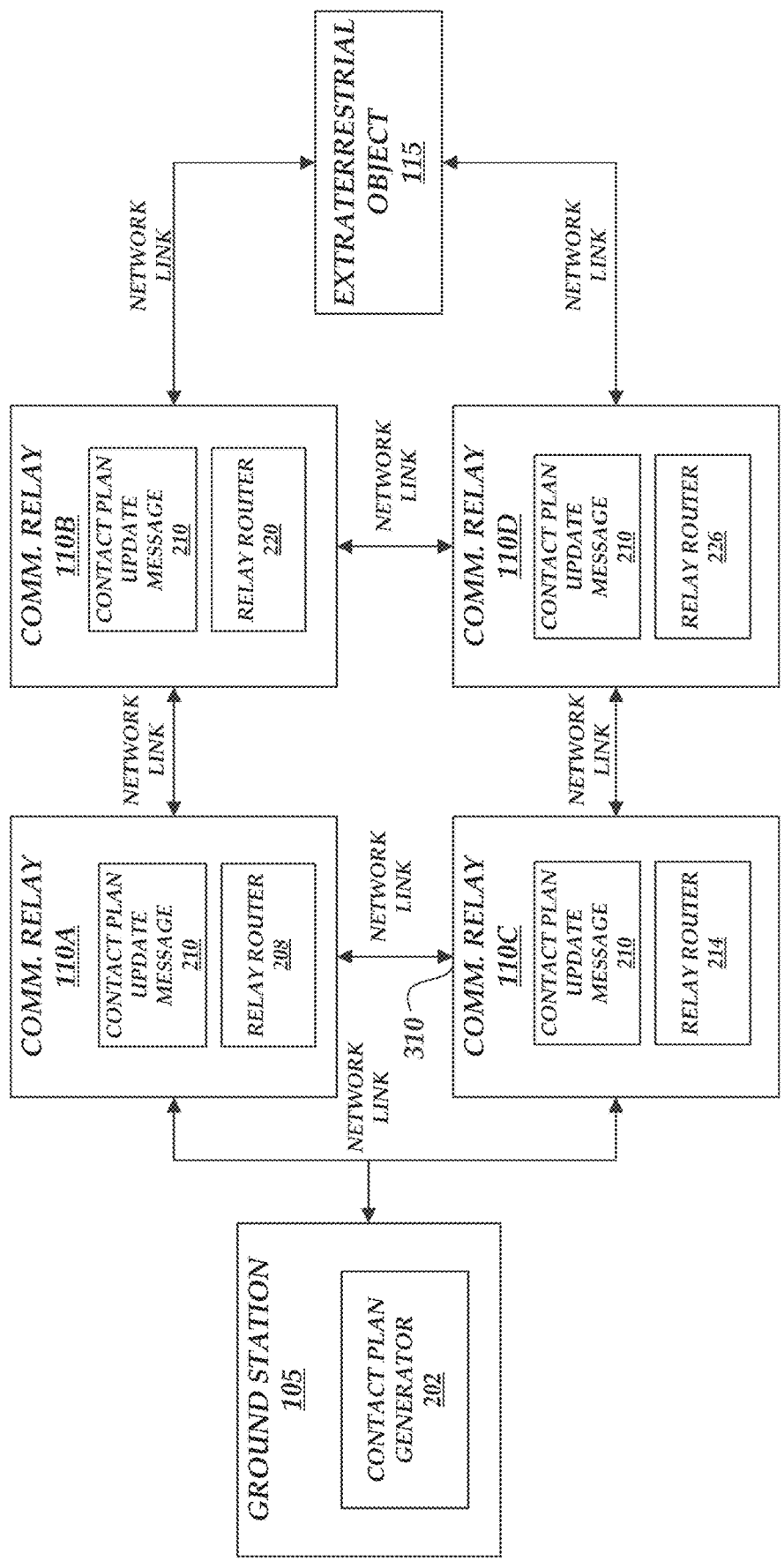
FIG. 2 is a block diagram of the communication between components of the interplanetary network of FIG. 1.

FIG. 2 is a block diagram of the communication between components of the interplanetary network 100 of FIG. 1. As shown in FIG. 2, the ground station 105 may include a contact plan generator 202 that can generate and propagate to one or more of the communication relays 110A-D and/or one or more extraterrestrial objects 115 an initial contact plan. For example, the contact plan generator 202 can obtain orbital parameters from one or more communication relays 110A-D. Using the orbital parameters, the contact plan generator 202 can compute an availability of connections or links between the ground station 105, one or more communication relays 110A-D, and/or the extraterrestrial object 115. As an illustrative example, to compute the availability of connections or links, the contact plan generator 202 can determine time window(s) during which various pairs of communication relays 110A-D may have a line of sight with each other and therefore may be able to communicate with each other using an orbital trajectory and/or link budget associated with some or all of the communication relay(s) 110A-D. Once the contact plan generator 202 determines which communication relay(s) 110A-D can communicate with each other during a given time window, the contact plan generator 202 can determine, for one or more time windows, one or more communication relays 110A-D that (1) are able to communicate with each other during the respective time window and (2) include at least one communication relay 110A-D that is able to communicate with the ground station 105 (e.g., has a line of sight with the ground station 105) during the respective time window and at least one communication relay 110A-D that is able to communicate with the extraterrestrial object 115 (e.g., has a line of sight with the extraterrestrial object 115) during the respective time window. Thus, the contact plan generator 202 can determine, for one or more time windows, one or more communication relays 110A-D that can form a path between the ground station 105 and the extraterrestrial object 115 during the respective time window. As another illustrative example, to compute the availability of connections or links, the contact plan generator 202 can use simulation and modeling to try random connection plans and to pick the best connection plan of those that are tried. In further embodiments, the contact plan generator 202 can determine, for one or more time windows and a ground station 105 (e.g., a transmission source or a transmission destination) and an extraterrestrial object 115 (e.g., a transmission destination or a transmission source), a path that is optimal for the transfer of data (e.g., that has the fewest number of hops, that results in the shortest transmission time from the extraterrestrial object 115 to the ground station 105 or vice-versa, etc.) between the ground station 105 and the extraterrestrial object 115.

The ground station 105 can propagate the initial contact plan to one or more communication relays 110A-D, and the one or more communication relays 110A-D can then propagate the initial contact plan to other communication relays 110A-D and/or extraterrestrial objects 115 with which the respective communication relay 110A-D is in contact until some or all communication relays 110A-D and/or extraterrestrial objects 115 have received the initial contact plan. The communication relays 110A-D may use a store-and-forward mechanism to propagate the initial contact plan and any other data to be transmitted in which a communication relay 110A-D stores the initial contact plan or data if no network link with another communication relay 110A-D is available and then transmits the initial contact plan or data to the other communication relay 110A-D once a network link becomes available.

As described herein, the ground station 105 and/or the communication relays 110A-D can continuously or periodically obtain orbital parameters from one or more communication relays 110A-D in the interplanetary network 110. For example, the orbital parameters can include the position, velocity, orientation, orbital trajectory (which can be based on the position, velocity, and/or orientation of a node), and/or radio frequency (RF) capabilities (e.g., the number and/or type of transceiver that may be available to transmit and/or receive data, the transmitted or transmission power that may be available to transmit data, the received power (e.g., link budget) that may be available for receiving data, noise measurements, interference measurements, etc.) of a communication relay 110A-D at some time in the future, and can include different positions, velocities, orientations, orbital trajectories, and/or RF capabilities of the communication relay 110A-D at multiple times in the future. Communication relays 110A-D in the interplanetary network 100 may be configured to continuously or periodically propagate their respective orbital parameters to one or more other communication relays 110A-D (e.g., relying on a current contact plan) for eventual transmission to the ground station 105 and/or other processing device and/or directly to the ground station 105 and/or other processing device.

In response to a change to the interplanetary network 100 (e.g., a new communication relay 110 is added to the interplanetary network 100, an existing communication relay 110A-D is removed from the interplanetary network 100, a new ground station 105 is added to the interplanetary network 100, an existing ground station 105 is removed from the interplanetary network 100, a new extraterrestrial object 115 is added to the interplanetary network 100, an existing extraterrestrial object 115 is removed from the interplanetary network 100, an existing communication relay 110, ground station 105, or extraterrestrial object 115 is temporarily unavailable, the orbital parameters of a communication relay 110 has changed, etc.) or periodically (e.g., every 30 seconds, every 1 minute, etc.), the contact plan generator 202 and/or one or more communication relays 110A-D can generate an updated contact plan and/or data that instructs the ground station 105 and/or other communication relays 110A-D how to update the existing contact plan. For example, the contact plan generator 202 can obtain current orbital parameters from the communication relays 110A-D (e.g., by requesting the orbital parameters from the communication relays 110A-D or by receiving orbital parameters transmitted periodically by the communication relays 110A-D without an explicit request from the ground station 105). The contact plan generator 202 can then generate a new or updated contact plan to replace the initial contact plan using the same techniques that are described above as being executed to generate the initial contact plan. The contact plan generator 202 can then generate a contact plan update message 210 that either includes the updated contact plan or data indicating changes to the initial contact plan and transmit the contact plan update message 210 to one or more communication relays 110A-D. A communication relay 110A-D that receives the contact plan update message 210 from the ground station 105 can then forward the contact plan update message 210 to one or more other communication relays 110A-D and/or to the extraterrestrial object 115, with these operations repeating until some or all of the communication relays 110A-D have received the contact plan update message 210.

As another example, a communication relay 110A-D can generate an updated contact plan and/or data that instructs the ground station 105 and/or other communication relays 110A-D how to update the existing contact plan. The communication relay 110A-D that generates the updated contact plan and/or data that instructs the ground station 105 and/or other communication relays 110A-D how to update the existing contact plan can be the communication relay 110A-D that caused a change to the interplanetary network 100 or a communication relay 110A-D that did not cause a change to the interplanetary network 100. For example, the communication relay 110A-D can obtain current orbital parameters from itself and the other communication relays 110A-D (e.g., by requesting the orbital parameters from the other communication relays 110A-D or by receiving orbital parameters transmitted periodically by the communication relays 110A-D without an explicit request from the communication relay 110A-D). The communication relay 110A-D can then generate a new or updated contact plan to replace the initial contact plan using the same techniques that are described above as being executed by the contact plan generator 202 to generate the initial contact plan. The communication relay 110A-D can then generate a contact plan update message 210 that either includes the updated contact plan or data indicating changes to the initial contact plan and transmit the contact plan update message 210 to one or more communication relays 110A-D. A second communication relay 110A-D that receives the contact plan update message 210 from the communication relay 110A-D that generated the contact plan update message 210 can then forward the contact plan update message 210 to one or more other communication relays 110A-D, to the ground station 105, and/or to the extraterrestrial object 115, with these operations repeating until some or all of the communication relays 110A-D have received the contact plan update message 210.

In some instances, where a communication path is not available for a communication relay 110A-D to transmit the contact plan update message 210 to another component in the interplanetary network 100, the contact plan update message 210 may be stored by the communication relay 110A-D for forwarding at a later time when the communication path is available.

Figure 3:
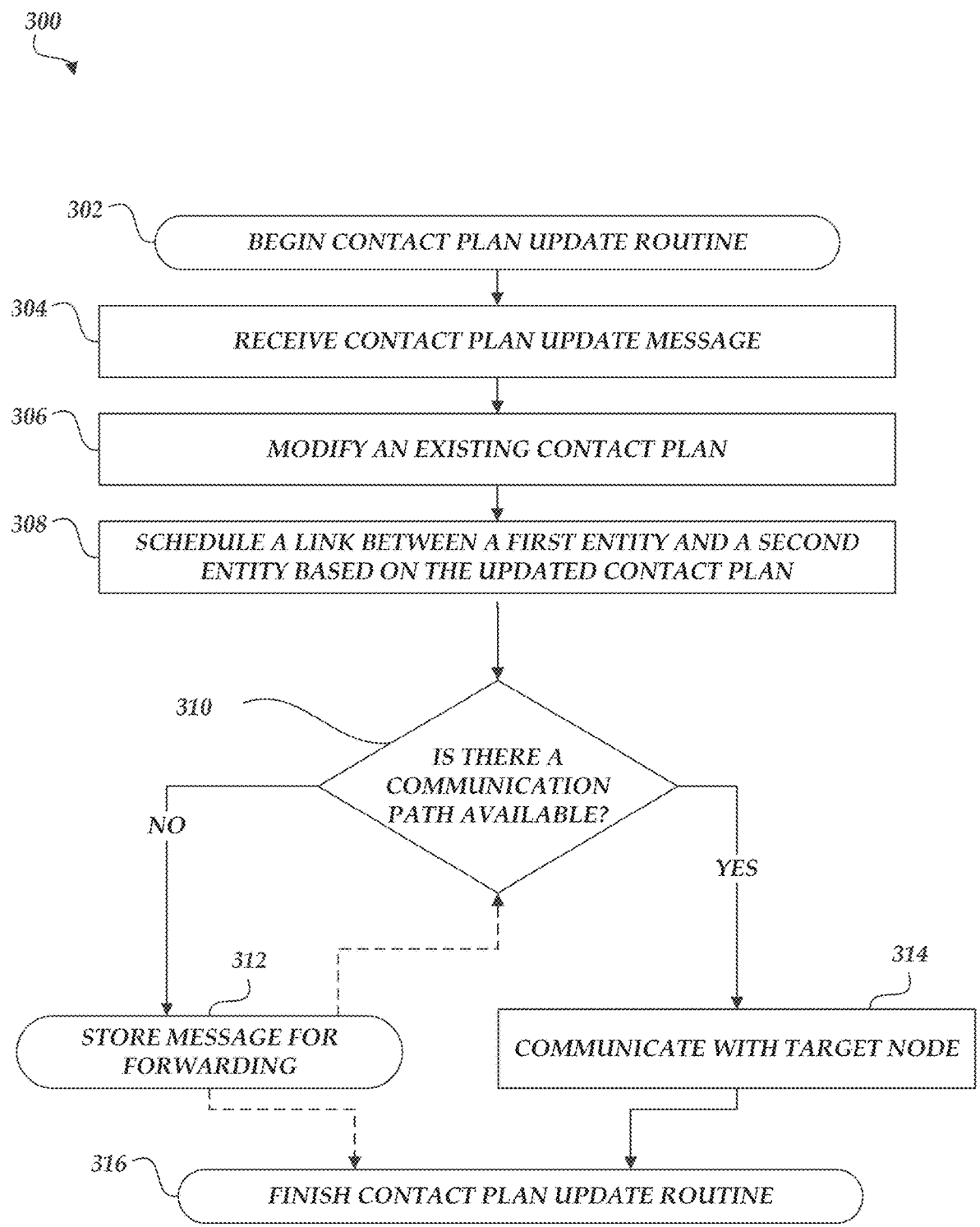
FIG. 3 is a flow diagram depicting an example contact plane update routine illustratively implemented by a ground station or a communication relay.

FIG. 3 is a flow diagram depicting an example contact plan update routine 300 illustratively implemented by a ground station or a communication relay. As an example, the contact plan generator 202 of the ground station 105 or one or more of the communication relays 110A-D can be configured to execute the contact plan update routine 300. The contact plan update routine 300 begins at block 302.

At block 304, a contact plan update message is received. For example, the ground station 105 or a first communication relay 110A-D can generate a contact plan update message (e.g., once or periodically as changes occur to the interplanetary network 100; periodically on a fixed or nearly fixed time interval (e.g., every 30 seconds, every 1 minute, etc.)) and transmit the contact plan update message to other components in the interplanetary network 100. The contact plan update message may be received from the component that generated the contact plan update message or from a communication relay 110A-D that did not otherwise generate the contact plan update message.

At block 306, an existing contact plan is modified based on the contact plan update message. For example, the contact plan update message may include an updated contact plan or data indicating changes to an existing contact plan (e.g., changes to the pairs of communication relays 110A-D that may have a direct line of sight and are able to communicate with each other during a particular period of time). If the contact plan update message includes an updated contact plan, then the existing contact plan may be replaced with the updated contact plan. If the contact plan update message includes data indicating changes to an existing contact plan, then the existing contact plan can be modified to incorporate the changes indicated in the contact plan update message (e.g., if a first and second communication relay 110A-D are now able to communicate between a first time and a second time rather than between a third time and a fourth time as indicated in the existing contact plan, the existing contact plan may be modified to remove an entry indicating that the first communication relay 110A-D and the second communication relay 110A-D are available to communicate between the third time and the fourth time and to add an entry indicating that the first communication relay 110A-D and the second communication relay 110A-D are available to communicate between the first and second time).

At block 308, a link or communication is scheduled between a first entity and a second entity for the transmission of a message based on the updated contact plan. For example, the link or communication may be scheduled during a time period in which the entity executing the contact plan update routine 300 is expected to have a line of sight with both the first entity and the second entity according to the updated contact plan. Optionally, the first entity and the second entity may be chosen based on an optionally optimal communication path indicated in the updated contact plan that is between a source and a destination and that includes the first entity, the second entity, and the entity executing the contact plan update routine 300.

At block 310, a determination is made as to whether a communication path is available between the entity executing the contact plan update routine 300 and the first entity and/or between the entity executing the contact plan update routine 300 and the second entity during the scheduled time period. While the updated contact plan may indicate that the entity executing the contact plan update routine 300 should be able to communicate with the first and second entities during the scheduled time period, sometimes communication links become unavailable. For example, an orbiting satellite can communicate with a ground station 105 when the orbiting satellite has a line of sight either to the ground station 105, or to a communication relay 110A-D that is in direct or indirect contact with the ground station 105. However, the orbiting satellite, the ground station, and/or a communication relay 110A-D can experience an unplanned outage or change in orbiting trajectory that causes the line of sight to no longer be present. If it is determined that no communication path is available, then the contact plan update routine 300 proceeds to block 312. Otherwise, if it is determined that a communication path is available, then the contact plan update routine 300 proceeds to block 314.

At block 312, a message to be transmitted during the scheduled time period is stored and later forwarded when a link or communication path becomes available. For example, the entity executing the contact plan update routine 300 can periodically check during the scheduled time period to determine whether the communication path is now available and transmit the message to the intended recipient once the communication path is available. Optionally, the entity executing the contact plan update routine 300 may discard the message from memory once the message is transmitted. If the scheduled time period passes without the communication path becoming available, the entity executing the contact plan update routine 300 may either continue to store the message until the next schedule time period arrives or discard the message (and the contact plan update routine 300 ends, as shown at block 316).

At block 314, a message to be transmitted during the scheduled time period is transmitted. After the message is transmitted, the contact plan update routine 300 ends, as shown at block 316.

Figure 4:
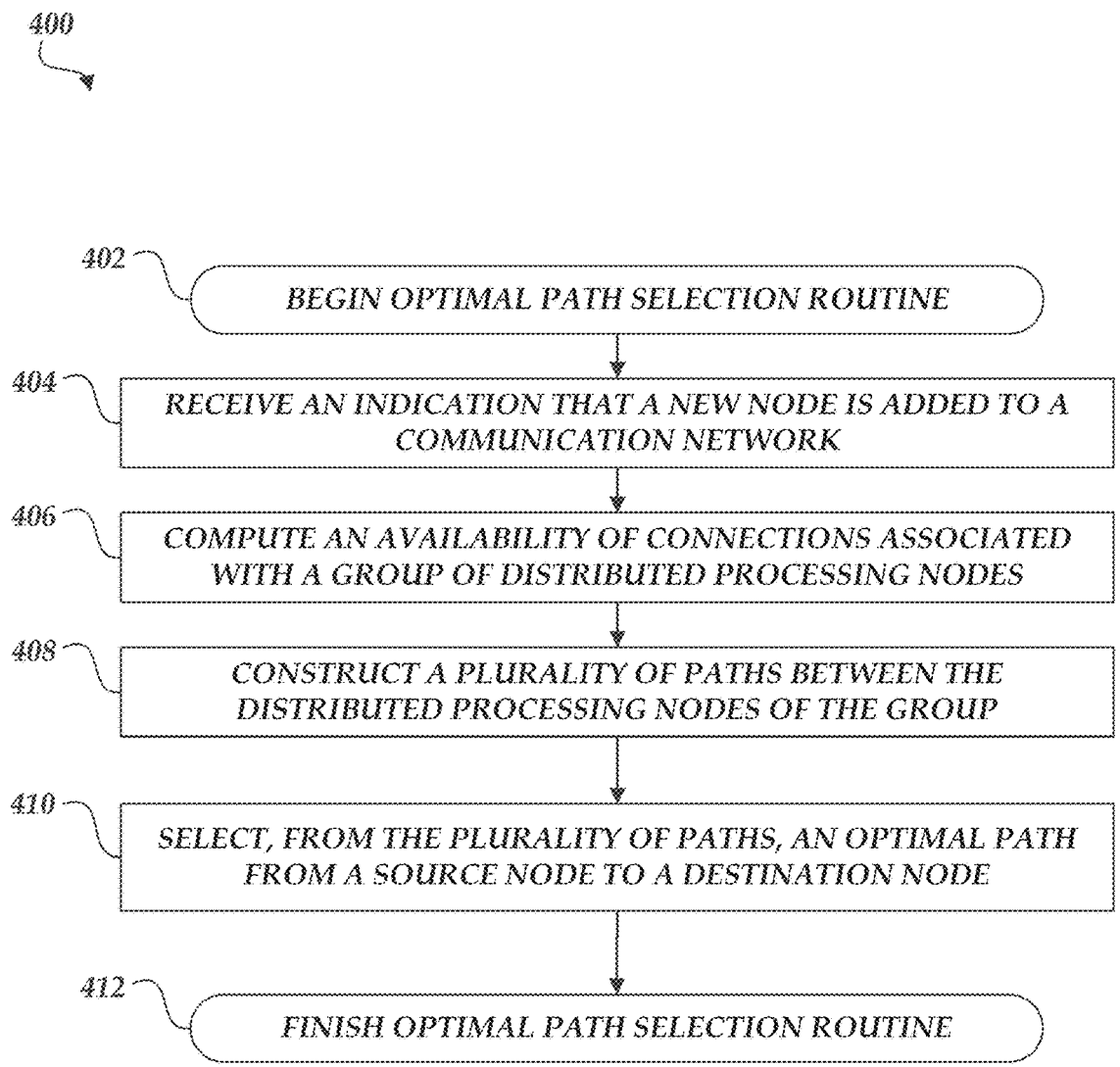
FIG. 4 is a flow diagram depicting an example optimal path selection routine illustratively implemented by a ground station or a communication relay.

FIG. 4 is a flow diagram depicting an example optimal path selection routine 400 illustratively implemented by a ground station or a communication relay. As an example, the contact plan generator 202 of the ground station 105 or one or more of the communication relays 110A-D can be configured to execute the optimal path selection routine 400. The optimal path selection routine 400 begins at block 402.

At block 404, an indication is received that a new node is added to a communication network. For example, the new node can be a processing node (e.g., a ground station 105, a communication relay 110, an extraterrestrial object 115, etc.) and the communication network can be the interplanetary network 100. The new node in combination with the other nodes in the communication network may collectively form a group of distributed processing nodes (e.g., each distributed processing node in the group may be a ground station 105, a communication relay 110, or an extraterrestrial object 115).

At block 406, an availability of connections associated with a group of distributed processing nodes is computed. For example, the availability of connections may be computed based on orbital parameters (e.g., an orbital trajectory and/or a link budget) of some or all of the distributed processing nodes in the group, where a connection between two distributed processing nodes may be available during a particular period of time if the orbital parameters of these distributed processing nodes indicate that the two distributed processing nodes may have a line of sight with each other during the particular period of time.

At block 408, a plurality of paths is constructed between the distributed processing nodes of the group. For example, the plurality of paths may be constructed based at least in part on the computed availability of connections. In particular, the plurality of paths may be constructed for particular periods of time between a source node and a destination node, and may be based on combining one or more connections available during the respective period of time that, when combined, form a path from the source node to the destination node.

At block 410, from the plurality of paths, an optimal path from a source node to a destination node is selected. In one embodiment, the path that has a highest reduction of a backlog of data to transmit from the source node to the destination node is selected. For example, the selected path may not necessarily be a shortest path between the source node and the destination node. Rather, the selected path may be the path that allows for the highest amount of data to be transmitted between the source node and the destination node within a particular period of time (which, in some cases, could be the shortest path), that allows a particular amount of data to be transmitted between the source node and the destination node within the shortest amount of time (which, in some cases, could be the shortest path), or that has the highest average bandwidth between the nodes in comparison to other paths (which, in some cases, could be the shortest path). Alternatively or in addition, a source node may be seeking to transmit data that may be considered higher priority than other data (e.g., video, audio, operational control data, etc.), and the path that is selected is the path that results in at least the higher priority data being transmitted to the destination node within a certain time period. For example, a characteristic of each path (e.g., the length of the path, the amount of data that can be transmitted along the path, the average bandwidth of the path, etc.) between the source node and the destination node can be weighted by the priority of the data to be transmitted by some or all of the nodes in the respective path. The selected path may then be the shortest path, the path that allows for the highest amount of data to be transmitted between the source node and the destination node within a particular period of time, the path that allows a particular amount of data to be transmitted between the source node and the destination node within the shortest amount of time, the path that has the highest average bandwidth, etc., taking the weighting into account (e.g., a path that is not otherwise the path with the highest average bandwidth may be selected if the path that is otherwise the path with the highest average bandwidth has a lower weight). After the path is selected, the optimal path selection routine 400 ends, as shown at block 412.

Figure 5:
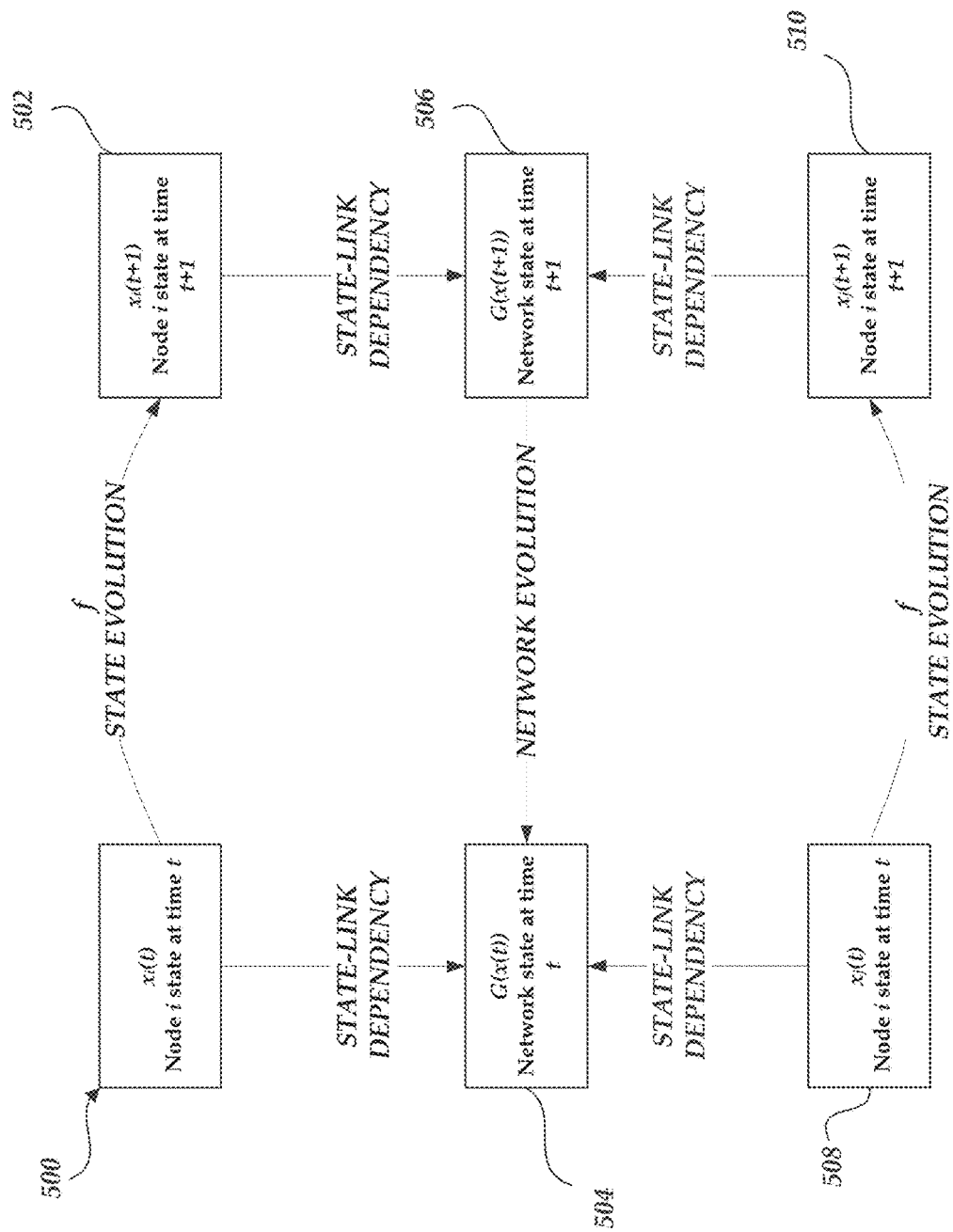
FIG. 5 is a state diagram of the evolution of components in the interplanetary network of FIG. 1 over time.

FIG. 5 is a state diagram of the evolution of nodes in the interplanetary network 100 over time. For example, the nodes can include components that operate on the surface of the Moon (e.g., a rover, an antenna of a ground station on the lunar surface, etc.), satellites traveling in space that are in communication with at least one of an Earth-bound ground station, a relaying satellite node, or a lunar ground station, an Earth-bound ground station, and/or the like. The state diagram and proofs described below demonstrate how use of orbital parameters to periodically update a contact plan can result in an improved interplanetary communication network.

The (multi-dimensional) state of node i in the network is represented by the vector $x_i(t)$ (see block 500), where t is the system time or the index of the time increment (e.g., the dimension of $x_i(t)$ would be three when $x_i(t)$ captures the position of the node). The collective states of all nodes in the network at time t can then be represented by the (multi-dimensional) vector x(t). Thus, the dimension of this state not only reflects the dimension of the nodes' states, but also the size of the network (e.g., for a 100 node network, the corresponding "position" state would be of dimension 300).

The presence or absence of a link can be explicitly parameterized, as well as the associated link quality (if existing) between nodes i and j at time t in the network in terms of their respective states $x_i(t)$ and $x_j(t)$.

As illustrated in FIG. 4, state G(x(t)) (see block 504) may capture the node connectivity and the respective link properties as a function of the node states at a given time. Note that G(x(t)) may be a more elaborate construct, and hence subsumes the information in the contact graph formalism often used in the DTN context. Furthermore, given that x(t) may be a dynamic state (e.g., positions of the satellites can evolve over time), the network (through state-link dependencies) can also be a "dynamic" entity. In fact, the dynamics of node i can be represented as follows (see block 502), where $x_i$ represents a position of node i, $u_i$ represents control inputs directed to node i, and $w_i$ represents the gravitational field and/or disturbances that affect node i:

$$x_i(t+1)=f_i(x_i(t),u_i(t),w_i(t)),\ i=1,2,\ldots,N$$

How the position of a spacecraft evolves can be further encoded according to the gravitational field, disturbances, and/or control inputs and/or the collective dynamics of the N nodes in the network, eventually arriving at the following symbolic representation:

$$x(t+1)=f(x(t),\ u(t),\ w(t))$$

In this case, the latter dynamics represented above may capture how some or all nodes in the network evolve over time, either through environmental forces (e.g., gravitational fields induced by Earth and Moon), disturbances (e.g., atmospheric drag in Earth LEO or third-body effects), and when appropriate, controlled inputs.

In some embodiments, the state-dependent network provides the backbone for the class of network-level optimization, and the corresponding routing algorithms, that may be implemented by the ground station 105 and/or the communication relays 110A-D. To have an analytic framework for such a development, in addition to physical states of the nodes (e.g., position or orientation), communication-related node states and the corresponding link variables can also be considered at time t. In some instances, let $b_i(t)$ denote, for example, the node i backlog (e.g., the number of packets in the queue of the transmitter of node i) and $s_{ij}(t)$ represent the utilization level of the (dynamic) link between nodes i and j at time t. For example, the utilization level of the link can be the rate at which information can be transmitted on the link with a desired error tolerance. As an illustrative example, if node i is the source connected to only one node j, then $$b_i(t+1)=b_i(t)-s_{ij}(t)$$

where $s_{ij}(t)$ is the rate at which packets (of the backlog in this instance) are transmitted. Generally, the evolution of the backlog (or stored information) can be represented at node i as follows:

$$b_i(t+1)=b_i(t)-\Sigma_j s_{ij}(t)+\Sigma_j s_{ji}(t),$$

where the first sum on the right-hand side of the equation is over all nodes j to which i can send or forward information, while the second sum is over all nodes j that can transmit or forward information to i. In some instances, when this parameterization of backlog evolution is combined with the state-dependent network, it becomes convenient to view $s_{ij}(t)=v_{ij}(t)w_{ij}(t),)$, where $v_{ij}(t)$ is the link utilization fraction (e.g., a scaling factor) of the (directed) link from i to j. As an example, suppose $v_{ij}(t)=1$ for all links in the network; that is, the information transmission rate is directly captured by the state-dependent link quality. In this case, the evolution of backlog across the network may be governed by the dynamics below:

$$b_i(t+1)=b_i(t)-\Sigma_j w_{ij}(t)+\tau_j w_{ji}(t),\ i=1,2,\ldots,N$$

which in view of the link-state dependency, can be written explicitly as:

$$b_i(t+1)=b_i(t)-\Sigma_j w_{ij}(x_i(t),x_j(t))+\Sigma_j w_{ji}(x_i(t),x_j(t)),$$
$$i=1,2,\ldots,N.$$

This evolution of communication-related node states can now be combined with the evolution of the physical node states as follows:

$$x(t+1)=f(x(t),\ u(t),\ w(t))$$

which may characterize the dynamics of the backlog on the state-dependent (orbit-aware) network. That is, in the context of orbit-aware networking, network dependent quantities, such as backlog, can be dependent on the dynamics of the nodes. The interplanetary network 100 disclosed herein aids with autonomous network operations (e.g., system configuration, neighbor discovery, resource scheduling, routing) to support unlimited scalability. Using the techniques described herein, the performance of on orbit networks can be automatically optimized and the best routing solution found without needing human intervention.

In some embodiments, the implementation of the interplanetary network 100 can be interoperable across multiple heterogeneous physical layers or protocols (e.g., IEEE 802.11 (e.g., Wi-Fi), 4G/LTE, Consultative Committee for Space Data Systems (CCSDS) protocols, etc.), and may be able to be plugged into existing architectures.

Terminology

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A method of routing communications from a first processing node to a final destination processing node within an evolving communication network that includes one or more nodes orbiting a planet, the method comprising:

receiving, at the first processing node of the communication network, an indication that a second processing node has been added to the communication network and, in combination with the first processing node and a set of one or more distributed processing nodes, forms a group of distributed processing nodes; and based on receiving the indication or a time period passing, updating a contact plan, wherein the contact plan indicates a time-indexed list of communication opportunities between the distributed processing nodes of the group, wherein updating the contact plan comprises:

computing an availability of connections associated with the distributed processing nodes of the group based at least in part on an orbital trajectory and link budget associated with each distributed processing node of the group of distributed processing nodes, constructing a plurality of paths between the distributed processing nodes of the group based at least in part on the computed availability of the connections, and selecting, from the plurality of paths, a path from the first processing node through the group of distributed processing nodes to the final destination processing node, wherein the selected path is one of a path that has a highest reduction of a backlog of data to transmit from the first processing node to the final destination processing node or a path that has a highest average bandwidth between the first processing node and the final destination processing node, to thereby define an updated contact plan.

2. The method of claim 1, further comprising receiving orbital parameters from each distributed processing node of the group of distributed processing nodes at a time after at least one of the distributed processing nodes in the group of distributed processing nodes has been launched into space, wherein the orbital parameters comprise the orbital trajectory and the link budget of the respective distributed processing node.

3. The method of claim 1, wherein the first processing node stores the contact plan prior to receiving the indication that the second processing node has been added to the communication network.

4. The method of claim 3, further comprising replacing the contact plan with the updated contact plan.

5. The method of claim 3, further comprising modifying the contact plan based on the updated contact plan.

6. The method of claim 5, wherein the updated contact plan comprises data indicating a change to the contact plan.

7. The method of claim 1, wherein computing an availability of connections further comprises:

computing, for a first time period, a first availability of connections associated with the distributed processing nodes of the group; and computing, for a second time period, a second availability of connections associated with the distributed processing nodes of the group, wherein the availability of connections comprises the first availability of connections and the second availability of connections.

8. The method of claim 1, wherein constructing a plurality of paths further comprises constructing a first path from the first processing node through the group of distributed processing nodes to the first destination processing node by combining one or more computed available connections.

9. The method of claim 1, wherein the contact plan comprises, for the first processing node, a start time and an end time during which the first processing node is available to communicate with a first distributed processing node in the set of the one or more distributed processing nodes.

10. The method of claim 1, wherein the first processing node comprises one of a ground station located on a surface of Earth or a communication relay orbiting in space.

11. The method of claim 1, wherein the final destination processing node comprises one of a ground station located on a surface of Earth or an extraterrestrial object located on a surface of a celestial body other than the Earth.

12. The method of claim 1, wherein each of the plurality of paths is weighted based on a priority of data to be transmitted, and wherein selecting, from the plurality of paths, a path from the first processing node through the group of distributed processing nodes to the final destination processing node further comprises selecting the path based on the weighting.

13. A system of routing communications within an evolving communication network that includes one or more nodes orbiting a celestial body, the system comprising:

a first processing node of the communication network comprising a first network interface; and a second processing node of the communication network comprising a processor and a second network interface, wherein the first processing node, the second processing node, and a set of one or more distributed processing nodes form a group of distributed processing nodes, the second processing node configured with computer-executable instructions that, when executed by the processor, cause the second processing node to:

obtain an indication that a change to the communication network has occurred;

based on obtaining the indication or a time period passing, compute an availability of connections associated with the distributed processing nodes of the group based at least in part on orbital parameters associated with each distributed processing node of the group of distributed processing nodes, construct a plurality of paths between the distributed processing nodes of the group based at least in part on the computed availability of the connections, and select, from the plurality of paths, a path from the second processing node through at least one of the set of one or more distributed processing nodes to a final destination processing node, wherein the selected path is one of a path that reduces a backlog of data to transmit from the second processing node to the final destination processing node from a first number of messages to a second number of messages lower than the first number of messages or a path that has a highest average bandwidth between the second processing node and the final destination processing node; and define an updated contact plan based on at least the selected path.

14. The system of claim 13, wherein the computer-executable instructions, when executed, further cause the second processing node to obtain the orbital parameters from each distributed processing node of the group of distributed processing nodes at a time after at least one of the distributed processing nodes in the group of distributed processing nodes has been launched into space, wherein the orbital parameters comprise at least one of an orbital trajectory or a link budget of the respective distributed processing node.

15. The system of claim 13, wherein the second processing node stores an existing contact plan prior to obtaining the indication that the change to the communication network has occurred.

16. The system of claim 15, wherein the computer-executable instructions, when executed, further cause the second processing node to replace the existing contact plan with the updated contact plan.

17. The system of claim 15, wherein the computer-executable instructions, when executed, further cause the second processing node to modify the existing contact plan based on the updated contact plan.

18. The system of claim 13, wherein the change to the communication network comprises one of the first processing node being added to the communication network subsequent to the second processing node being launched into space and being part of the communication network, a third processing node being removed from the communication network, or the orbital parameters of the first processing node changing.

19. The system of claim 13, wherein the computer-executable instructions, when executed, further cause the second processing node to:
compute, for a first time period, a first availability of connections associated with the distributed processing nodes of the group; and
compute, for a second time period, a second availability of connections associated with the distributed processing nodes of the group, wherein the availability of connections comprises the first availability of connections and the second availability of connections.

20. The system of claim 13, wherein the updated contact plan comprises, for the second processing node, a start time and an end time during which the second processing node is available to communicate with a first distributed processing node in the set of the one or more distributed processing nodes.

21. The system of claim 13, wherein each of the plurality of paths is weighted based on a priority of data to be transmitted, and wherein the computer-executable instructions, when executed, further cause the second processing node to select the path based on the weighting.

22. A non-transitory, computer-readable medium comprising computer-executable instructions for routing communications from a first processing node to a final destination processing node within an evolving communication network that includes one or more nodes orbiting a celestial body, wherein the computer-executable instructions, when executed by a computer system, cause the computer system to:
obtain, at the first processing node of the communication network, an indication that a change to the communication network has occurred, wherein the first processing node and a set of one or more distributed processing nodes form a group of distributed processing nodes; and
based on receiving the indication or a time period passing,
compute an availability of connections associated with the distributed processing nodes of the group based at least in part on orbital parameters associated with each distributed processing node of the group of distributed processing nodes,
construct a plurality of paths between the distributed processing nodes of the group based at least in part on the computed availability of the connections, and
select, from the plurality of paths, a path from the first processing node through the group of distributed processing nodes to the final destination processing node, wherein the selected path is one of a path that has a highest reduction of a backlog of data to transmit from the first processing node to the final destination processing node or a path that has a highest average bandwidth between the first processing node and the final destination processing node, to thereby define an updated contact plan.

23. The non-transitory, computer-readable medium of claim 22, wherein each of the plurality of paths is weighted based on a priority of data to be transmitted, and wherein the computer-executable instructions, when executed, further cause the computer system to select the path based on the weighting.

* * * * *